United States Patent
Okamoto et al.

(10) Patent No.: US 10,720,807 B2
(45) Date of Patent: Jul. 21, 2020

(54) MAGNET-TYPE ROTOR, ROTARY ELECTRIC MACHINE EQUIPPED WITH MAGNET-TYPE ROTOR, AND ELECTRIC VEHICLE EQUIPPED WITH ROTARY ELECTRIC MACHINE

(71) Applicant: Hitachi Automotive Systems, Ltd., Hitachinaka-shi, Ibaraki (JP)

(72) Inventors: Hiromitsu Okamoto, Hitachinaka (JP); Shinji Yamazaki, Hitachinaka (JP); Tomohiro Fukuda, Hitachinaka (JP); Mohdbasir Zulaika, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 57 days.

(21) Appl. No.: 15/771,063

(22) PCT Filed: Oct. 5, 2016

(86) PCT No.: PCT/JP2016/079563
§ 371 (c)(1),
(2) Date: Apr. 25, 2018

(87) PCT Pub. No.: WO2017/073275
PCT Pub. Date: May 4, 2017

(65) Prior Publication Data
US 2018/0309334 A1 Oct. 25, 2018

(30) Foreign Application Priority Data
Oct. 30, 2015 (JP) .................................. 2015-213642

(51) Int. Cl.
*H02K 1/27* (2006.01)
*H02K 29/03* (2006.01)

(52) U.S. Cl.
CPC ............. *H02K 1/2766* (2013.01); *H02K 1/27* (2013.01); *H02K 1/276* (2013.01); *H02K 29/03* (2013.01);
(Continued)

(58) Field of Classification Search
CPC ........ H02K 1/27; H02K 1/276; H02K 1/2766; H02K 29/03; H02K 2201/06; Y02T 10/641
See application file for complete search history.

(56) References Cited

U.S. PATENT DOCUMENTS 9,287,742 B2 * 3/2016 Reddy ................... H02K 1/272
2002/0140308 A1 * 10/2002 Inayama ................ H02K 1/278
310/156.47

(Continued)

FOREIGN PATENT DOCUMENTS

EP 2 099 114 A2 9/2009
EP 2 101 395 A2 9/2009
(Continued)

OTHER PUBLICATIONS

Japanese-language International Search Report (PCT/ISA/210) issued in PCT Application No. PCT/JP2016/079563 dated Jan. 24, 2017 with English translation (two (2) pages).
(Continued)

*Primary Examiner* — Naishadh N Desai
(74) *Attorney, Agent, or Firm* — Crowell & Moring LLP (57) ABSTRACT

Provided is a permanent magnet-type rotary electric machine which reduces torque ripples which are generated when powered up and cause noises and vibrations of a rotary electric machine. The rotary electric machine includes a stator having a stator winding and a rotor which is rotatably disposed to the stator and provided with a plurality of magnets. In a magnetic auxiliary salient pole formed
(Continued)

between poles of the magnets provided in the rotor, a cogging torque is reduced and torque ripples generated when powered up are reduced by combining a magnetic cavity provided on a q axis passing through the center of the salient pole and a skewing in which a plurality of block cores are stacked and connected as a unit while deviating by a predetermined angle in a peripheral direction of the axis of the rotor.

8 Claims, 13 Drawing Sheets

(52) U.S. Cl.
 CPC ......... *H02K 2201/06* (2013.01); *Y02T 10/641* (2013.01)

(56) References Cited

U.S. PATENT DOCUMENTS

| | | | | |
|---|---|---|---|---|
| 2004/0124728 A1* | 7/2004 | Yamaguchi | ............ | H02K 1/278 310/156.25 |
| 2004/0130236 A1* | 7/2004 | Yonekura | ............... | H02K 1/146 310/216.011 |
| 2005/0121990 A1 | 6/2005 | Kaneko | | |
| 2006/0244335 A1* | 11/2006 | Miyazaki | ............... | H02K 1/278 310/156.47 |
| 2007/0205689 A1* | 9/2007 | Nemoto | ................ | H02K 29/03 310/12.22 |
| 2008/0018190 A1* | 1/2008 | Takahata | ............... | H02K 1/276 310/156.56 |
| 2008/0218023 A1* | 9/2008 | Niguchi | ................ | H02K 1/278 310/156.55 |
| 2009/0224619 A1* | 9/2009 | Okubo | .................. | H02K 1/278 310/156.25 |
| 2015/0357892 A1* | 12/2015 | Nakano | ................ | H02K 29/03 180/443 |
| 2015/0380997 A1* | 12/2015 | Song | .................... | H02K 1/2773 310/156.08 |
| 2016/0020653 A1* | 1/2016 | Ueda | ..................... | H02K 1/276 310/43 |
| 2016/0365762 A1* | 12/2016 | Liang | .................. | H02K 1/2706 |
| 2016/0380492 A1* | 12/2016 | Kawasaki | ........... | H02K 1/2766 310/156.11 |
| 2018/0269732 A1* | 9/2018 | Lee | ........................ | H02K 1/276 |

FOREIGN PATENT DOCUMENTS

| | | |
|---|---|---|
| EP | 2 348 611 A1 | 7/2011 |
| EP | 2 615 721 A1 | 7/2013 |
| EP | 2 779 386 A2 | 9/2014 |
| JP | 7-336917 A | 12/1995 |
| JP | 2005-176424 A | 6/2005 |
| JP | 2013-162557 A | 8/2013 |
| JP | 2014-054060 A | 3/2014 |
| JP | 2014-138433 A | 7/2014 |
| WO | WO 2015/159658 A1 | 10/2015 |

OTHER PUBLICATIONS

Japanese-language Written Opinion (PCT/ISA/237) issued in PCT Application No. PCT/JP2016/079563 dated Jan. 24, 2017 (four (4) pages).

Extended European Search Report issued in counterpart European Application No. 16859512.2 dated May 23, 2019 (nine (9) pages).

* cited by examiner

MAGNET-TYPE ROTOR, ROTARY ELECTRIC MACHINE EQUIPPED WITH MAGNET-TYPE ROTOR, AND ELECTRIC VEHICLE EQUIPPED WITH ROTARY ELECTRIC MACHINE

TECHNICAL FIELD

The present invention relates to a magnet-type rotor, a rotary electric machine equipped with the magnet-type rotor, and an electric vehicle equipped with the rotary electric machine.

BACKGROUND ART

A large output power is required for a drive motor used in an electric vehicle and a hybrid vehicle (a drive rotary electric machine). Therefore, there is generally used a permanent magnet-type motor which uses a sintered magnet containing a rare earth element to hold a strong energy. As a drive motor, an embedded magnet motor which satisfies requirements such as a large torque at a low speed and a wide rotation speed range is used among the permanent magnet-type motors.

By the way, torque ripples of the motor cause noises and vibrations. In particular, the torque ripples generated at a low speed in the electric vehicle causes uncomfortable to ride in. In a conventional permanent magnet-type motor, skewing is performed as a countermeasure in order to reduce the torque ripples.

For example, PTL 1 discloses a motor in which grooves are provided in a magnetic steel plate on the peripheral sides of the embedded magnet, and disposed to be deviated in an axial direction.

CITATION LIST

Patent Literature

PTL 1: JP 2005-176424 A

SUMMARY OF INVENTION

Technical Problem

However, in the motor provided with the grooves on the peripheral sides of the magnet, for example, the grooves are provided at places where the magnetic flux flows when powered up. Therefore, if the grooves are provided at positions where ripples are reduced when powered up, a cogging torque is increased. If the grooves are provided at positions where the cogging torque is reduced, the torque ripples are increased when powered up.

An object of the present invention is to reduce the torque ripples which are generated when powered up and cause noises and vibrations of the motor.

Solution to Problem

A magnet-type rotor, a rotary electric machine, and an electric vehicle according to the present invention include: a plurality of permanent magnets; and a plurality of core pieces which form a magnetic insertion hole, wherein the plurality of core pieces are stacked to skew the permanent magnet, wherein the plurality of core pieces form a magnetic resistance varying portion to cancel a harmonic number different from a harmonic number which is cancelled by the skew, and wherein the magnetic resistance varying portion is formed such that a center portion in a peripheral direction of a magnetic varying region generated by the magnetic resistance varying portion is overlapped with a q axis.

Advantageous Effects of Invention

According to the present invention, it is possible to reduce torque ripples which are generated when powered up and cause noises and vibrations of a motor.

DESCRIPTION OF EMBODIMENTS

Hereinafter, embodiments of the present invention will be described using the drawings.

A rotary electric machine according to the embodiment can suppress torque ripples when powered up, and a compact size, a low cost, and low torque ripples can be realized. Therefore, for example, it is possible to provide an electric vehicle which is suitable as a drive motor of an electric vehicle, and has low vibrations and low noises, so that it is comfortable to ride in. The rotary electric machine according to the embodiment can be applied to a pure electric vehicle which is driven only by the rotary electric machine and a hybrid electric vehicle which is driven by both an engine and the rotary electric machine. The description hereinafter will be given about the hybrid electric vehicle as an example.

First Embodiment

Figure 1:
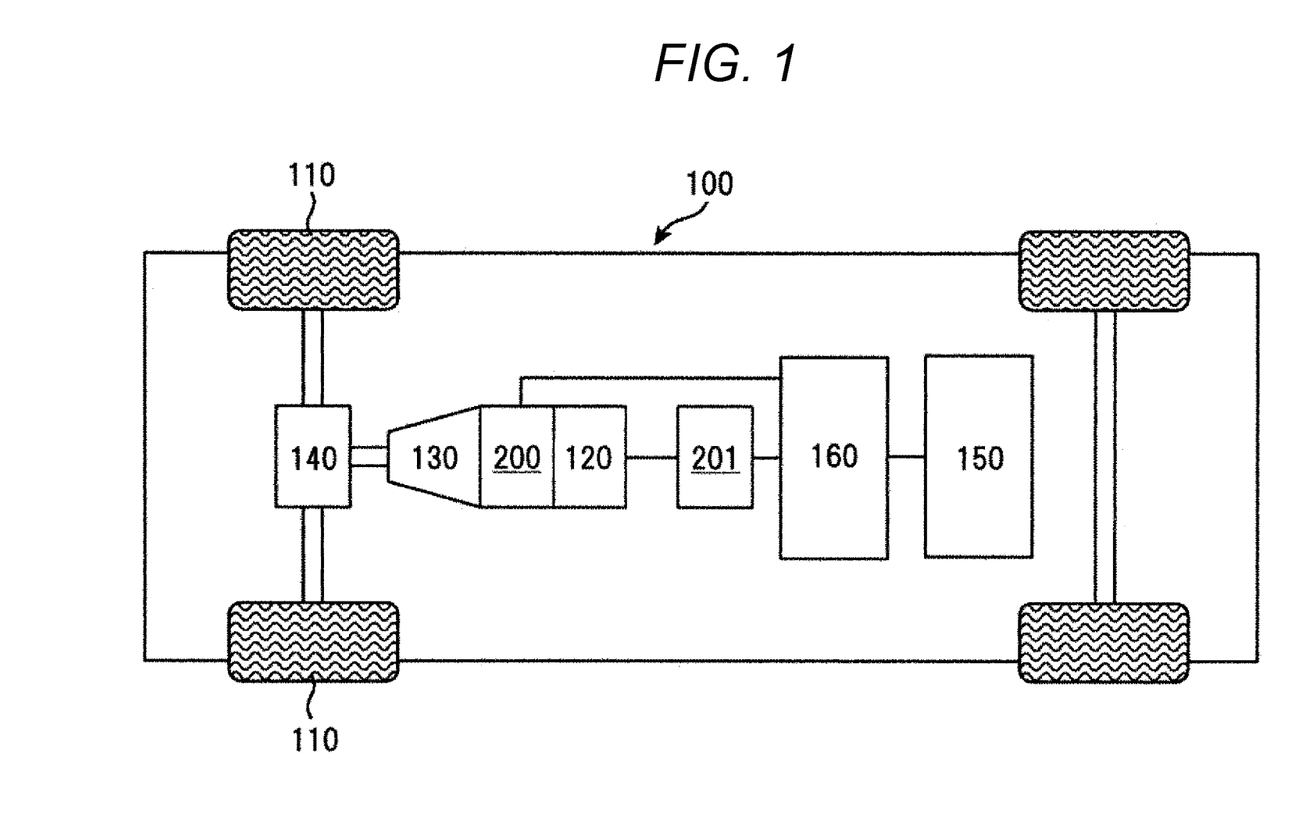
FIG. 1 is a diagram schematically illustrating a hybrid electric vehicle to which a rotary electric machine according to an embodiment of the present invention is mounted.

As illustrated in FIG. 1, an engine 120, a first rotary electric machine 200, a second rotary electric machine 201, and a high voltage battery 150 are mounted in a hybrid vehicle 100.

The battery 150 is configured by a secondary battery such as a lithium ion battery or a nickel hydrogen battery, and outputs DC power of a high voltage from 250 to 600 or more. In a case where drive forces of the rotary electric machines 200 and 201 are necessary, the battery 150 supplies the DC power to the rotary electric machines 200 and 201, and is supplied with the DC power from the rotary electric machines 200 and 201 during regenerative running. The transferring of the DC power between the battery 150 and the rotary electric machines 200 and 201 is performed through a power conversion device 160.

In addition, while not illustrated in the drawings, a battery for supplying low-voltage power (for example, 14 voltage power) is mounted in the vehicle.

A rotation torque generated by the engine 120 and the rotary electric machines 200 and 201 is transferred to front wheels 110 through a transmission 130 and a differential gear 140.

Since the rotary electric machines 200 and 201 are configured almost the same, the description below will be mainly given about the rotary electric machine 200.

Figure 2:
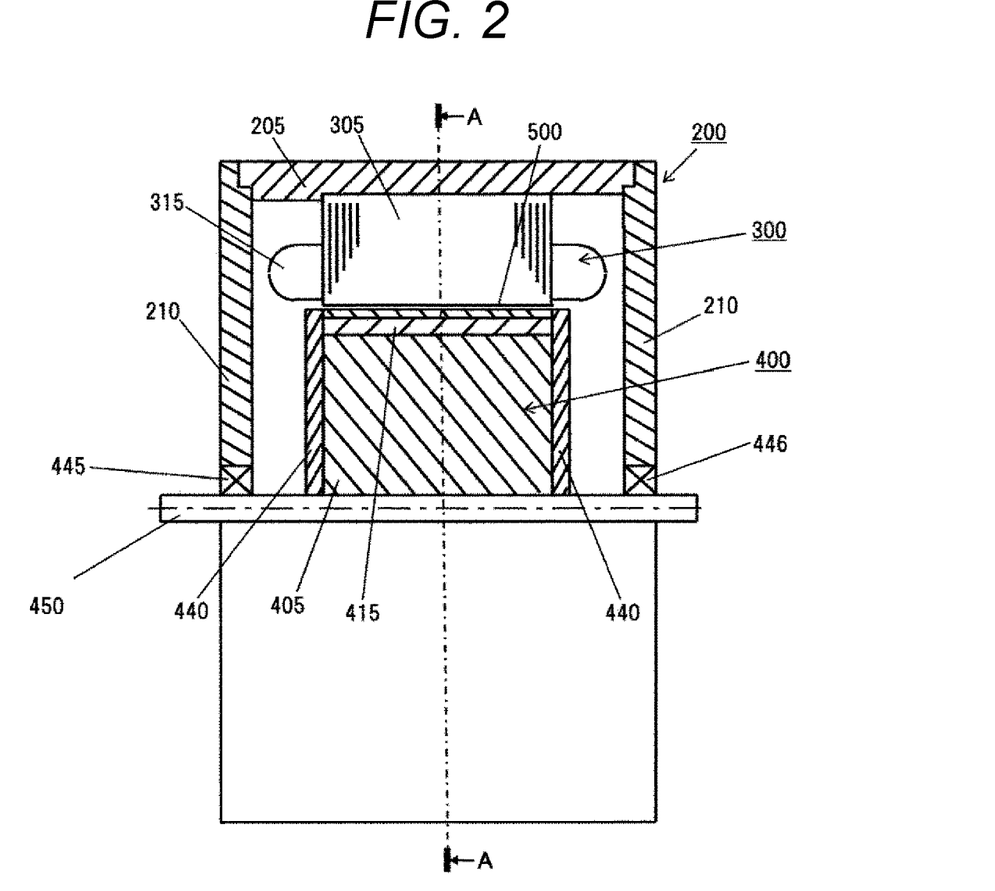
FIG. 2 is a cross-sectional view of a rotary electric machine 200 of FIG. 1.

FIG. 2 is a diagram schematically illustrating the entire configuration of the rotary electric machine 200. In FIG. 2, some part of the rotary electric machine 200 is illustrated in cross-sectional view, and thus the inside of the rotary electric machine 200 can be viewed.

As illustrated in FIG. 2, a stator 300 is supported in a housing 205. The stator 300 is provided with a stator core 305 and a stator winding 315. A rotor 400 is rotatably supported in the inner peripheral side of the stator core 305 with a gap 500 therebetween. The rotor 400 is provided with a rotor core 405 fixed to a shaft 450, a permanent magnet 415, and a non-magnetic end plate 440. The housing 205 includes a pair of end brackets 210 which are provided with gears 445 and 446. The shaft 450 is rotatably supported by these gears 445 and 446.

The rotary electric machine 200 is a three-phase synchronous motor in which a permanent magnet is built. The rotary electric machine 200 operates as an electric machine which rotates the rotor 400 by supplying three-phase AC currents to the stator winding 315 wound around the stator core 305. In addition, the rotary electric machine 200 operates as a generator when being driven by the engine 120, and outputs the three-phase AC generated power. In other words, the rotary electric machine 200 has a function as an electric machine which generates a rotation torque on the basis of the electric energy and a function as a generator which generates power on the basis of the mechanic energy. These functions can be used selectively according to a running state of the vehicle.

Figure 3:
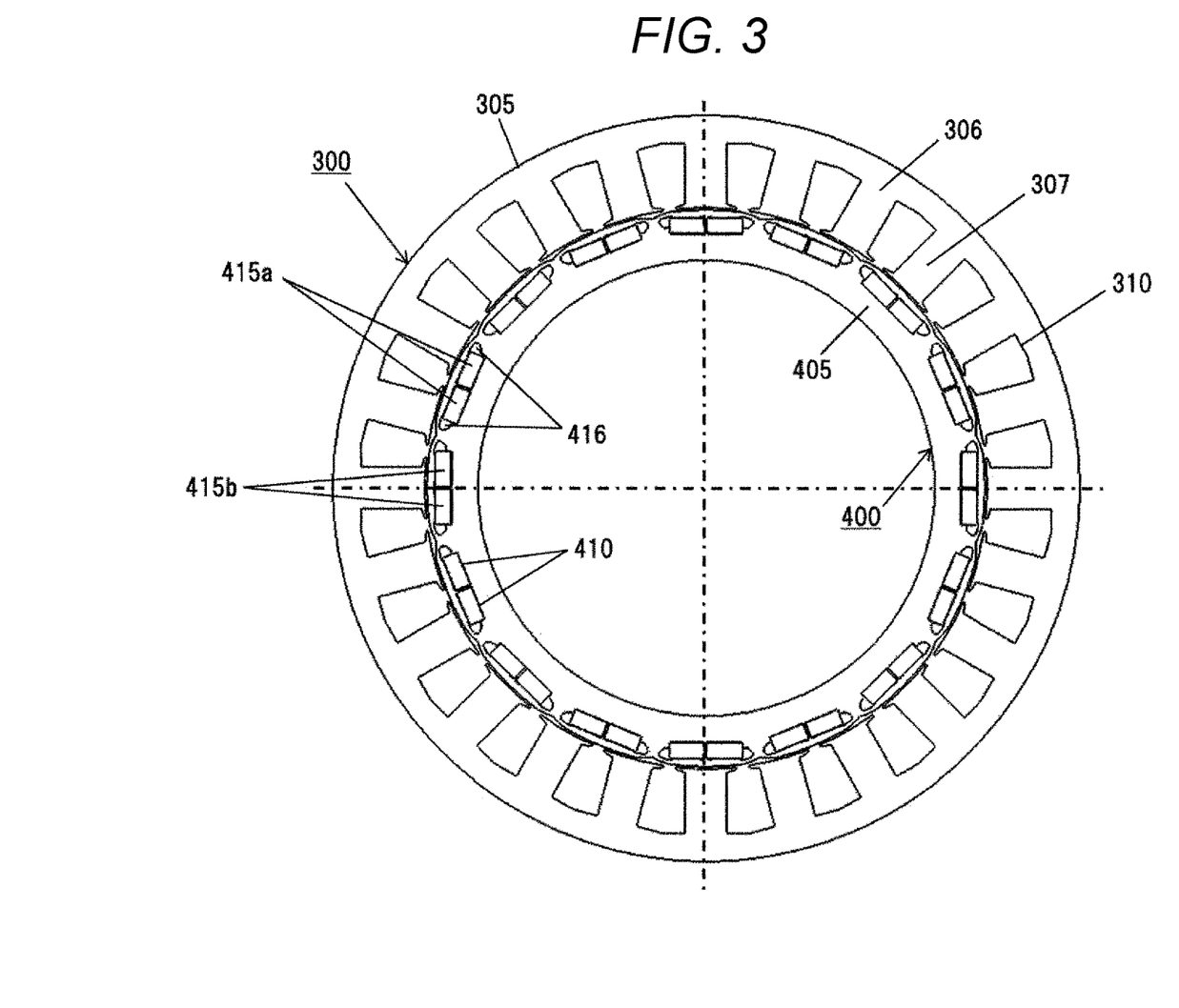
FIG. 3 is a cross-sectional view taken along line A-A of a stator and a rotor of FIG. 2.

FIG. 3 is a diagram schematically illustrating the cross section of the stator 300 and the rotor 400 illustrated in FIG. 2, that is, a cross-sectional view taken along line A-A of FIG. 2. Further, the housing 205 and the shaft 450 are omitted in FIG. 3. The stator core 305 is formed by stacking a plurality of magnetic materials (for example, a plurality of magnetic steel plates) in an axial direction, and is configured by a yoke portion and a teeth portion (also referred to as a projection or a salient pole). The yoke portion is configured by a cylinder yoke core 306 (also referred to as a core back) which is fitted to the inner peripheral side of the housing 205. The teeth portion protrudes in a radial direction from the inner peripheral side of the yoke core 306, and is configured by a plurality of teeth cores 307 which are disposed in a peripheral direction at a predetermined interval therebetween. In this embodiment, 24 teeth cores 307 are formed in the inner peripheral side of the yoke core 306.

Between the adjacent teeth cores 307, 24 slots 310 are formed on a side near the rotor 400 continuously in the peripheral direction. The slot 310 is provided with a slot insulator (not illustrated). A plurality of windings such as U-phase, V-phase, and W-phase are mounted to form the stator 300. In this embodiment, a concentrated winding method is employed as a winding method of the stator winding 315 (see FIG. 2). Herein, the concentrated winding method is a winding method of directly winding the stator winding 315 about the teeth core 307 of one pole. In this embodiment, since the concentrated winding method is applied as a winding method, it is possible to reduce copper loss of the rotary electric machine 200, and also reduce a length in the axial direction of the stator 300.

In addition, a magnetic insertion hole 410 to which a rectangular magnet is inserted is opened in the rotor core 405. The permanent magnet 415 is buried in the magnetic insertion hole 410, and fixed with an epoxy adhesive. A width in the peripheral direction of the magnetic insertion hole 410 is set to be larger than that in the peripheral direction of the permanent magnet 415. Magnetic cavities 416 are formed on both sides of the permanent magnet 415. The magnetic cavity 416 may be filled with an adhesive, or may be integrally fixed with the permanent magnet 415 with a molding resin. The permanent magnet 415 serves as a field pole of the rotor 400.

A magnetization direction of the permanent magnet 415 is aligned in the radial direction. The magnetization direction is inversed at every field pole. In other words, assuming that a surface of a permanent magnet 415a on a side near the stator is an N pole and a surface on a side near the axis is an S pole, a surface of a neighbor permanent magnet 415b on a side near the stator becomes the S pole, and a surface on a side near the axis becomes the N pole. Then, the permanent magnets 415a and 415b are alternately disposed in the peripheral direction. In this embodiment, 16 permanent magnets 415 are disposed at an equal interval. The rotor 400 is configured by 16 poles.

The permanent magnet 415 may be buried in the rotor core 405 after magnetization, or may be magnetized by applying a strong magnetic field before the magnetization and after being inserted to the rotor core 405. The magnetized permanent magnet 415 is a strong magnet. When the magnet is magnetized before the permanent magnet 415 is fixed to the rotor 400, there occurs a strong attraction force with respect to the rotor core 405 during fixing the permanent magnet 415, and such a centripetal force may hinder a work. In addition, there is a concern that dusts such as metal powder is attached to the permanent magnet 415 by the strong attraction force. Therefore, the magnetization after inserting the permanent magnet 415 to the rotor core 405 is better to improve a productivity of the rotary electric machine.

A neodymium/samarium-based sintered magnet, a ferrate magnet, and a neodymium-based bond magnet may be used as the permanent magnet 415. A residual magnetic flux density of the permanent magnet 415 is about 0.4 to 1.3 T.

Figure 4:
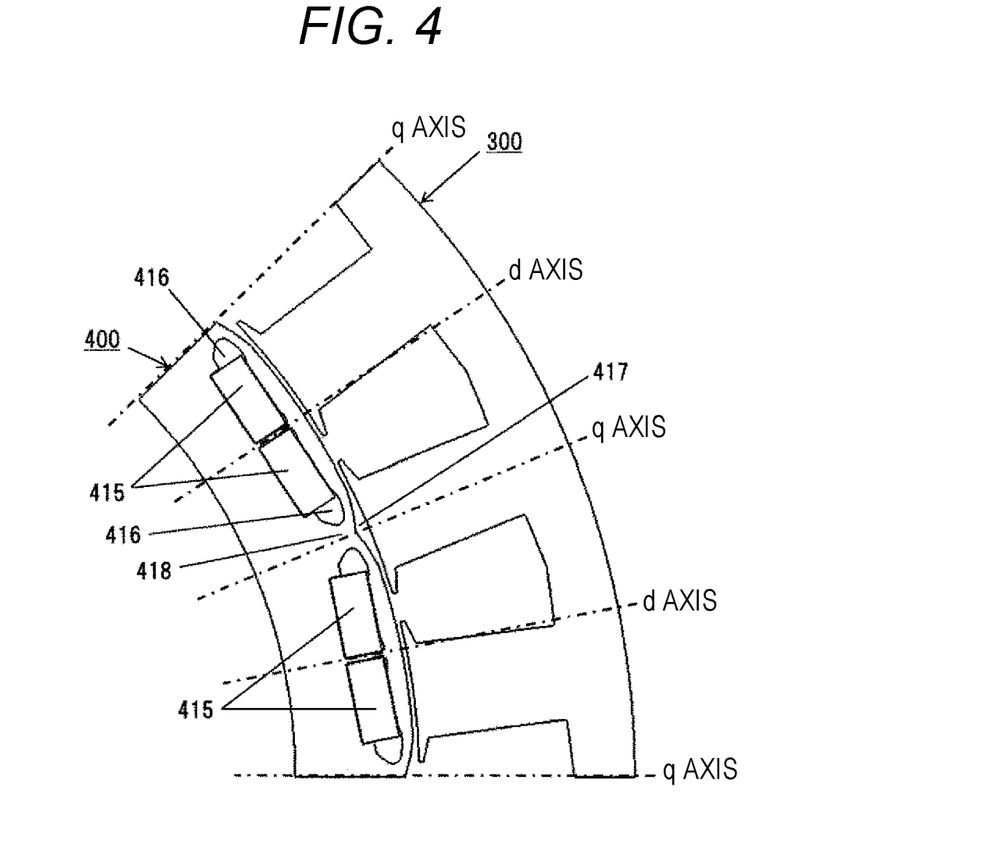
FIG. 4 is a cross-sectional view taken along line A-A in the vicinity of a permanent magnet of FIG. 2.

FIG. 4 illustrates apart of the cross-sectional view of FIG. 3 on a magnified scale. In this embodiment, an auxiliary salient pole 418 is formed between the respective permanent magnets 415 which form the magnetic pole. In general, an axis in which the magnetic flux passes through the center of the magnet is called a d axis, and an axis in which the magnetic flux flows from gap to gap of the poles of the magnet is called a q axis. At this time, an iron core at the center between the poles of the magnet is called an auxiliary magnetic pole 418. Since a magnetic permeability of the permanent magnet 415 provided in the rotor 400 is almost the same as that of the air, a d-axis portion is magnetically concave, and a q-axis portion is magnetically convex when viewed from the stator 300. Therefore, the iron core of the q-axis portion is called a salient pole.

In the rotor core 405, a groove forming a magnetic cavity 417 is provided in the auxiliary magnetic pole 418 of the surface of the rotor 400 besides the magnetic cavities 416 formed on both sides of the permanent magnet 415. The magnetic cavity 416 is provided to reduce a cogging torque. The magnetic cavity 417 is provided to reduce the torque ripples when powered up, and formed along a concave shape of the outer surface of the rotor core 405.

In addition, the magnetic cavities 417 may be formed symmetrically or asymmetrically to the q axis passing between the magnetic poles in the peripheral direction of the rotor 400, and are disposed symmetrically to the d axis which is the center axis of the magnetic pole. Further, the magnetic cavity 417 may be formed in a simple cavity region, and also may be formed by disposing a material having a magnetic resistance higher than that of the rotor core 405 in a cavity.

Figure 5:
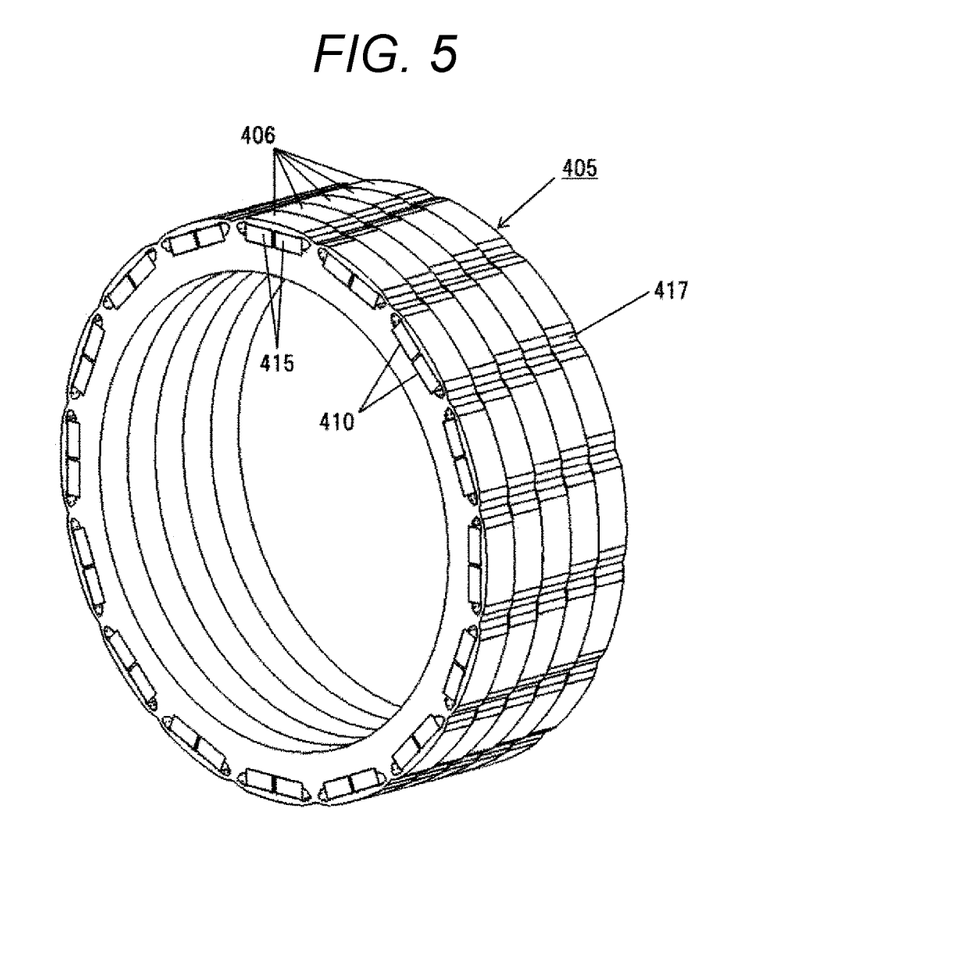
FIG. 5 is a perspective view of a stator core of FIG. 2.

FIG. 5 is a perspective view illustrating the rotor core 405 of the rotor 400 and the permanent magnet 415. The rotor core 405 is configured by a plurality of core pieces 406 as illustrated in FIG. 5. A length of one core piece 406 in the axial direction is provided to be almost the same dimension as the length of another core piece 406 in the axial direction.

A plurality of the core pieces 406 are stacked and connected as a unit while deviating by a predetermined angle in the peripheral direction of the axis of the rotor (referred to as "skew"). All the core pieces are integrally formed as one rotor 400. In this embodiment, five stages of the core pieces 406 are connected in the axial direction.

In addition, in a case where the plurality of core pieces 406 are stacked and connected, the magnetic cavity 417 formed in the surface of the rotor 400 and the permanent magnet 415 buried in the magnetic insertion hole 410 are also disposed in the axial direction while deviating by a predetermined angle in the peripheral direction of the rotor.

Figure 6:
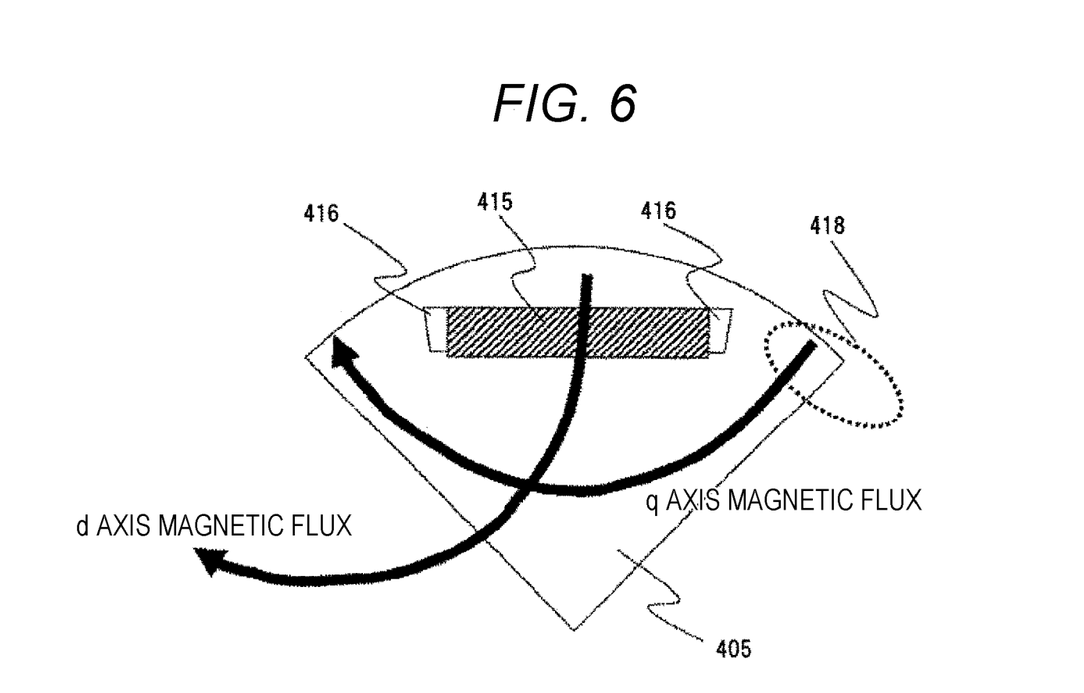
FIG. 6 is a diagram for describing a reluctance torque.

FIG. 6 is a diagram for describing a reluctance torque. The reluctance torque is generated by a difference in easiness that the magnetic flux passes between the d axis and the q axis illustrated in FIG. 6 (that is, a salient pole ratio indicating magnetic regularities).

When a rotating magnetic field is generated around the stator 300 by the three-phase AC currents, the rotating magnetic field is used for the permanent magnet 415 of the rotor 400 to generate a magnetic torque. Further, the reluctance torque operates on the rotor 400 in addition to the magnetic torque.

In this way, the rotary electric machine to which the embodiment is applied is a rotary electric machine which uses both the magnetic torque and the reluctance torque of the auxiliary salient pole. Then, the torque ripples are generated from the magnetic torque and the reluctance torque. The torque ripples contain a ripple component generated when not powered up and a ripple component generated when powered up. The ripple component generated when not powered up is generally called a cogging torque. In a case where the rotary electric machine is actually used as a loaded state, the cogging torque and the ripple component when powered up are combined to generate the torque ripples.

Most methods of reducing the torque ripples of the rotary electric machine refer only to a reduction of the cogging torque but not to the torque ripples generated when powered up. However, in many cases, noises of the rotary electric machine are generated on a heavy load instead of no load. In other words, it is important to reduce the torque ripples during being loaded in order to reduce the noises of the rotary electric machine. Only reducing the cogging torque is not sufficient.

Next, the description will be given about a method of reducing the torque ripples in this embodiment.

Herein, a skewing which is a method of reducing the torque ripples by changing and cancelling phases of the torque ripples is well known and thus will be omitted in explanation. A method of reducing the torque ripples using the magnetic cavity 417 provided in the auxiliary magnetic pole 418 of the rotor 400 will be described.

First, an influence of the magnetic cavity 417 when not powered up will be described. The magnetic flux of the permanent magnet 415 is short-circuited in the ends of the magnet when not powered up. Therefore, no magnetic flux passes through the q axis. The magnetic flux passing the stator core 305 reaches the teeth core 307 through a core portion on a side near the stator of the permanent magnet 415. Therefore, since the magnetic cavity 417 does almost not influence on the magnetic flux which relates to the cogging torque when not powered up, it can be seen that the magnetic cavity 417 does not influence on the cogging torque.

In addition, an induced voltage is a voltage to be generated when the magnetic flux of the magnet of the rotating rotor 400 is cancelled with the stator winding 315. However, even the waveform of the induced voltage is not influenced by the presence/absence of the magnetic cavity 417 and by the shape.

Figure 7:
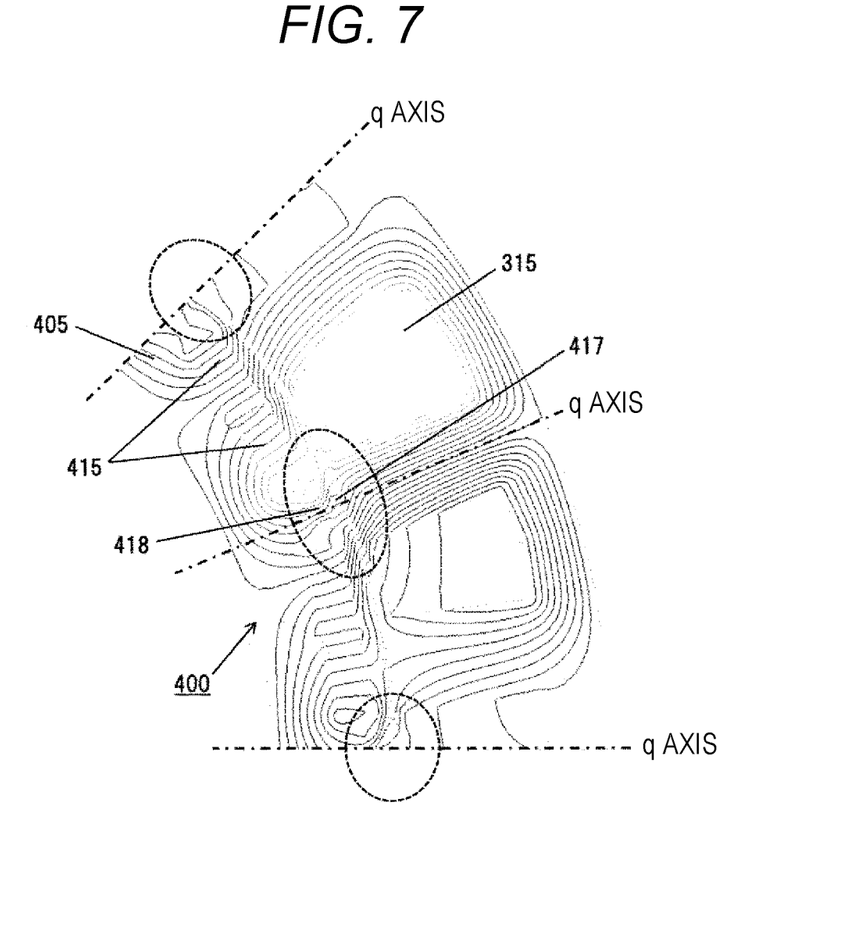
FIG. 7 is a diagram illustrating a magnetic flux distribution in a cross section taken along line A-A when powered up.

Next, the description will be given about an influence of the magnetic cavity 417 when powered up. FIG. 7 is a diagram illustrating a simulation result of a magnetic flux distribution in a case where the stator winding 315 in this embodiment is powered up. In the simulation diagram of FIG. 7, the magnetic flux flows to the q axis of the rotor core 405. This is because the current of the stator 300 generates the magnetic flux in the q axis.

Figure 8:
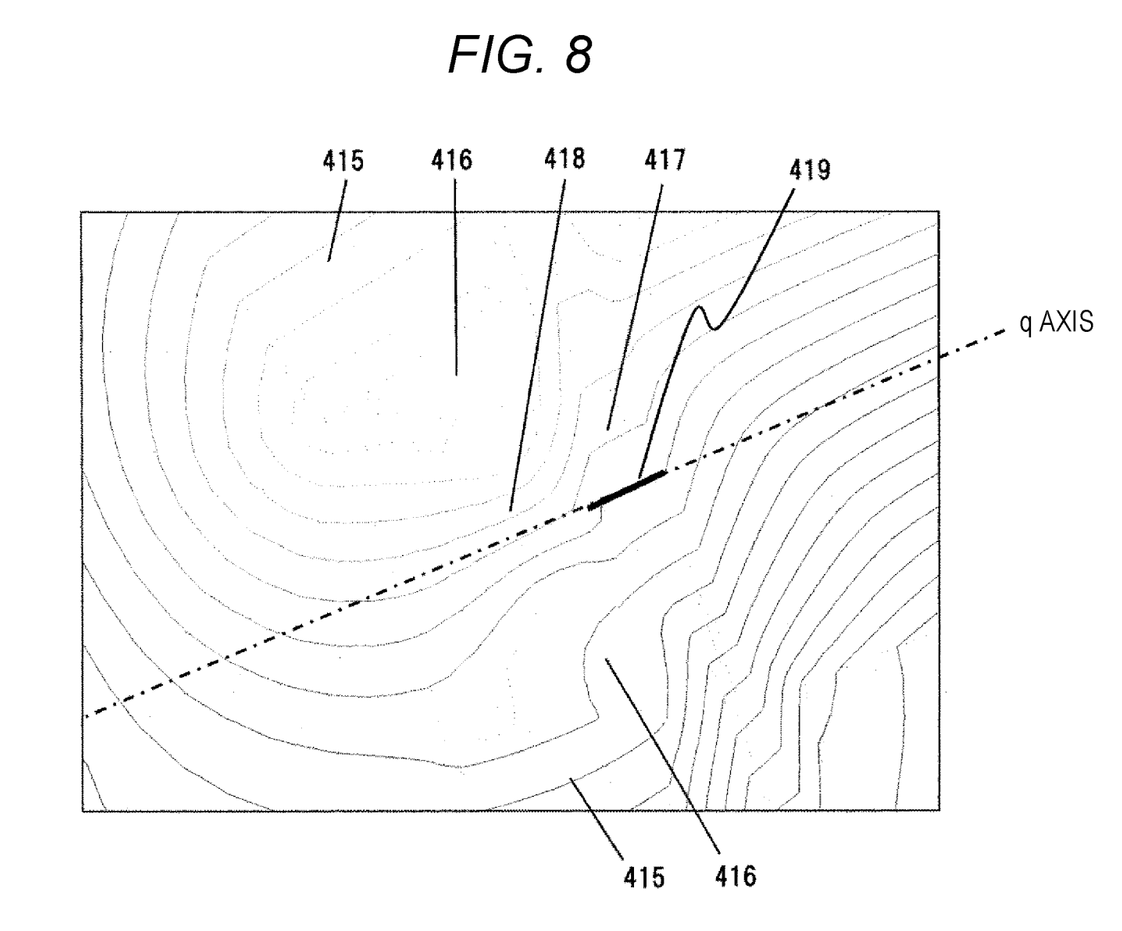
FIG. 8 is a partially enlarged diagram of an auxiliary magnetic pole of a q axis of the magnetic flux distribution of FIG. 7.

FIG. 8 is a partially enlarged view illustrating the auxiliary magnetic pole 418 and the magnetic cavity 417 in the simulation diagram of the magnetic flux distribution illustrated in FIG. 7. In the simulation diagram of FIG. 8, the magnetic flux flowing to the auxiliary magnetic pole 418 of the q axis varies according to the magnetic cavity 417. In other words, it can be said that the magnetic flux (magnetic field) varies in a region of the magnetic cavity 417.

The magnetic cavity 417 in this embodiment is desirably formed such that a center portion 419 in the peripheral direction of the magnetic varying region is overlapped with the q axis.

Figure 9:
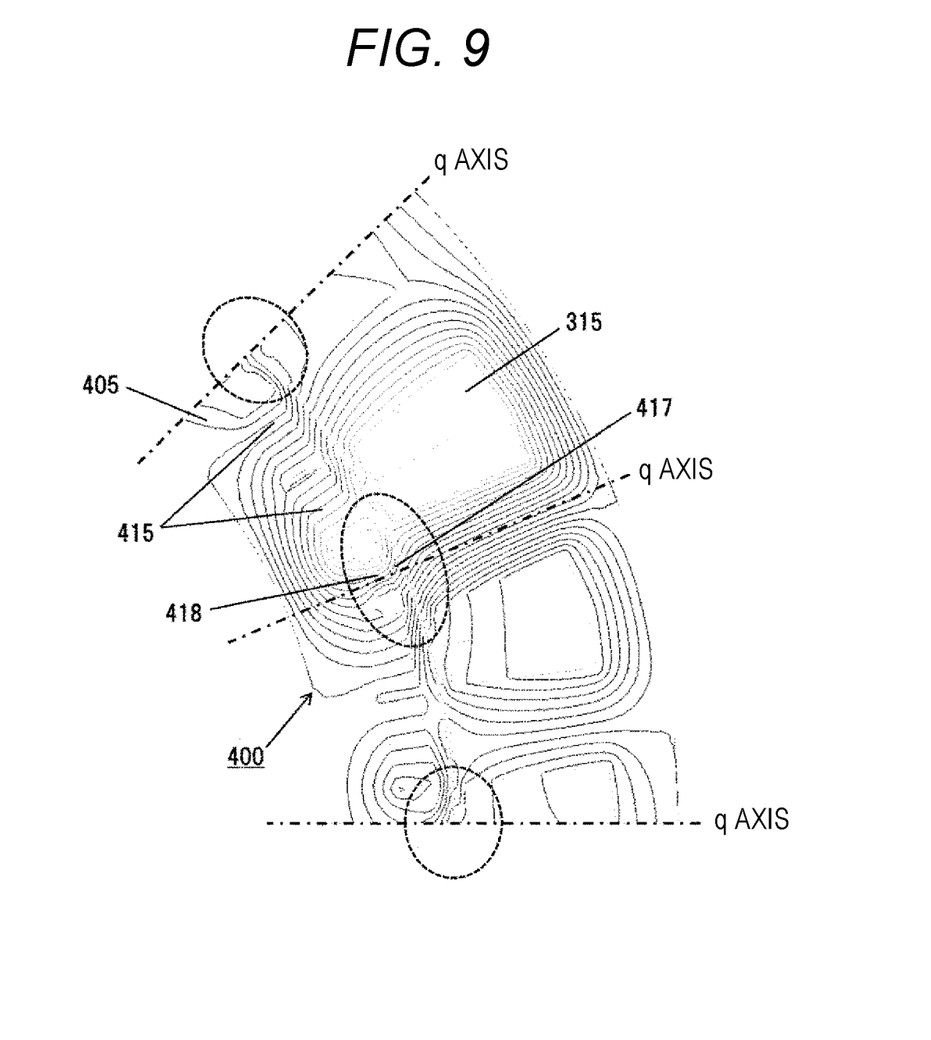
FIG. 9 is a diagram illustrating a magnetic flux distribution of a rotary electric machine, when powered up, in which a magnetic cavity is not provided in the auxiliary magnetic pole of the q axis.

On the other hand, FIG. 9 is a diagram illustrating a simulation result of the magnetic flux distribution in a case where the magnetic cavity 417 is not provided and the stator winding 315 is powered up. From the simulation results of FIGS. 7 and 9, it can be seen that the flow of the magnetic flux of the auxiliary magnetic pole 418 varies according to the magnetic cavity 417. Therefore, it can be said that the magnetic cavity 417 in the auxiliary magnetic pole 418 is magnetically influenced only when powered up.

It can be seen that, in the case of the three-phase current, the torque ripples of the rotary electric machine 200 when powered up are generated in 6f-th components (f=1, 2, 3, . . . : natural number) at an electrical angle caused by a spatial harmonic and a time harmonic contained in a phase current which are superimposed for each one-phase and one-pole coil.

Figure 10:
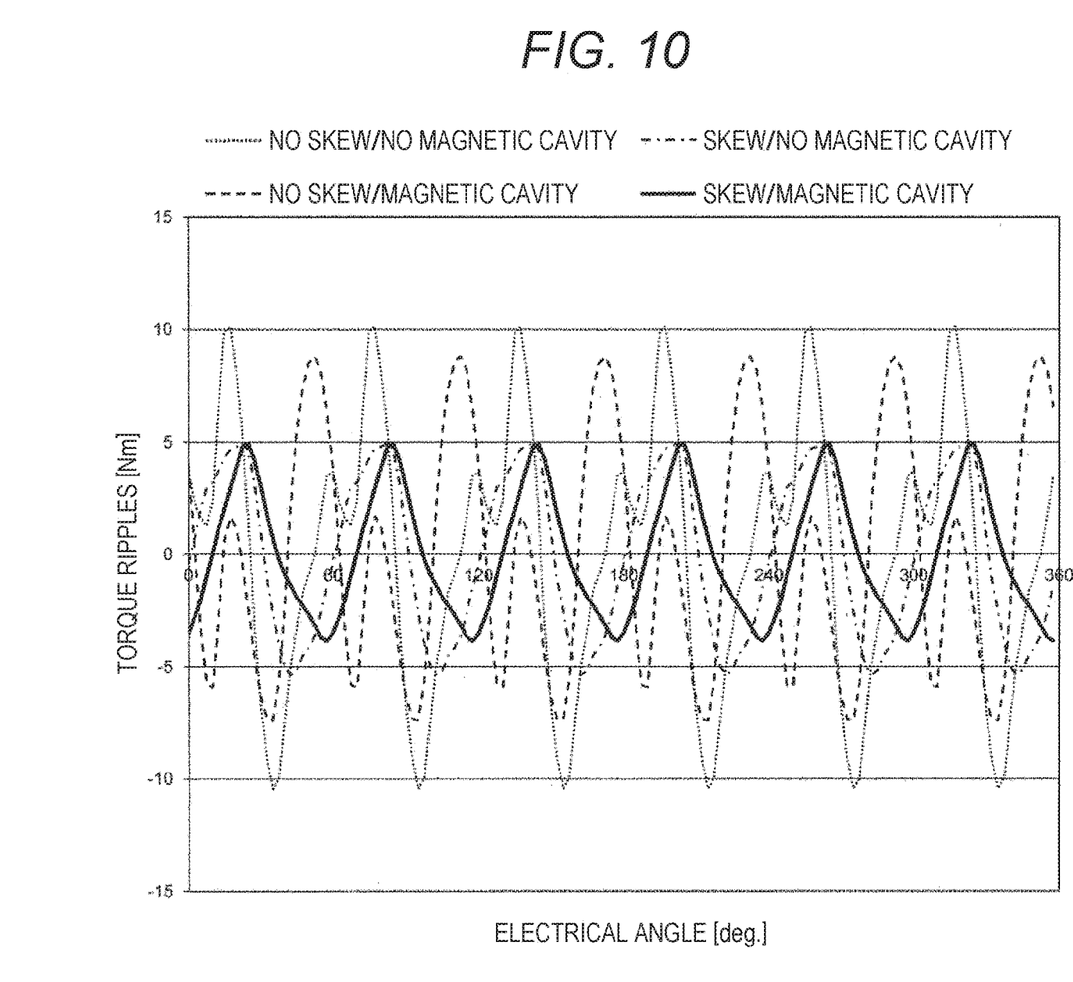
FIG. 10 is a diagram illustrating waveforms of torque ripple when powered up.

FIG. 10 is a diagram illustrating waveforms of the torque ripples when powered up in four configurations: the rotor 400 (having skew, and the magnetic cavity 417); a rotor 400a (having no skew, no magnetic cavity 417); a rotor 400b (having skew, no magnetic cavity 417); and a rotor 400c (having no skew, having the magnetic cavity 417) in this embodiment. Comparing the waveforms of the torque ripples of FIG. 10, it can be seen that the rotor 400 having the skew and having the magnetic cavity 417 has the smallest amplitude of the waveforms of the torque ripples compared to the other configurations. Therefore, the torque ripples of the rotary electric machine 200 can be suppressed at a maximum by combining the skew of the rotor 400 and the magnetic cavity 417 in this embodiment.

Figure 11:
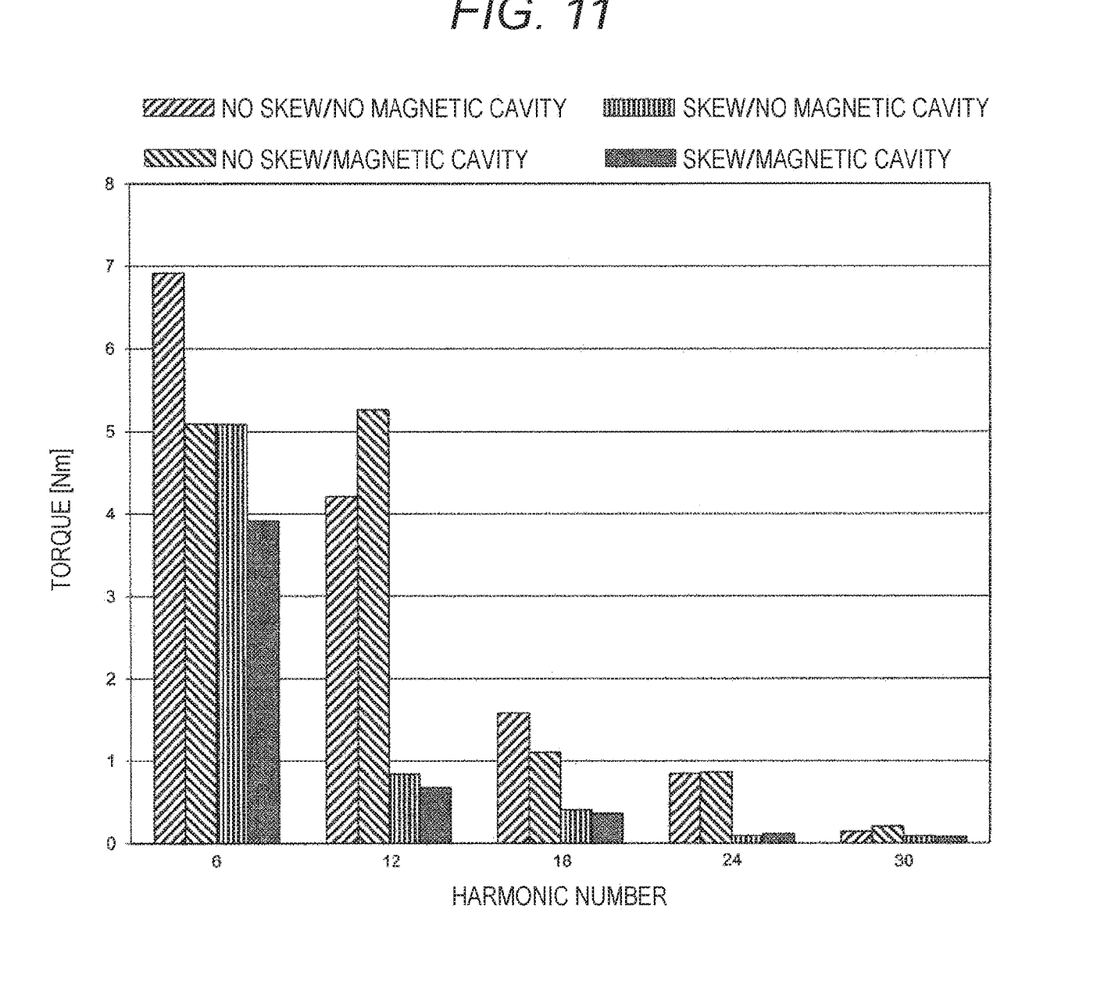
FIG. 11 is a graph which is obtained by Fourier-expanding the torque ripples of FIG. 9.

FIG. 11 is a diagram illustrating a result obtained by Fourier-expanding the waveforms of the torque ripples illustrated in FIG. 10. From the result of FIG. 11, it is possible to most reduce 6-th, 12-th, 18-th, 24-th, and 30-th harmonics using the rotor 400 having the skew and the magnetic cavity 417 compared to the other configurations.

In addition, regarding a harmonic reduction effect in each of the configurations having the skew and the magnetic cavity 417, the configuration having the skew shows a high reduction effect in 12-th, 18-th, 24-th, and 30-th harmonics, and the magnetic cavity 417 of the auxiliary magnetic pole 418 shows a high reduction effect specially in 6-th harmonic. Therefore, regarding a reduction of the torque ripples in the case of the configuration having the skew and when the magnetic cavity 417 is loaded, it can be seen that different harmonics are reduced in the respective configurations. It also can be seen that the harmonic numbers reduced by the skew are high order compared to those reduced by the magnetic cavity 417.

Second Embodiment

Figure 12:
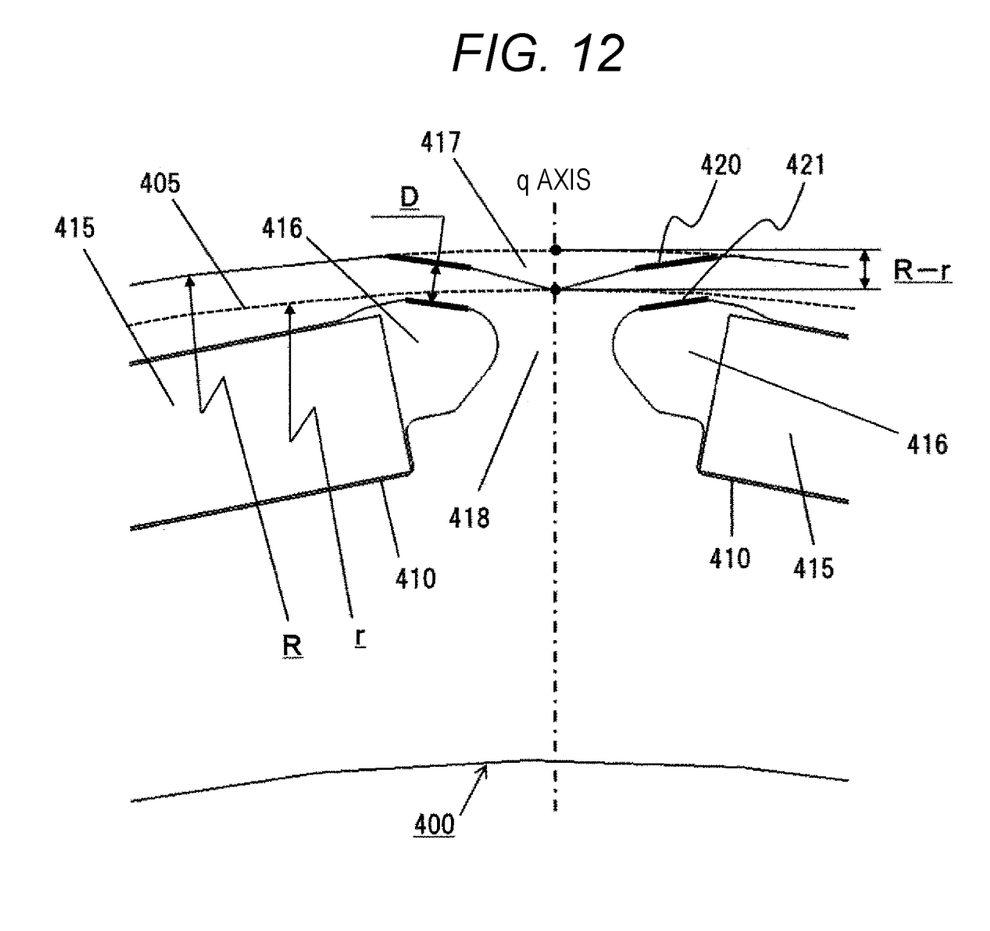
FIG. 12 is an enlarged view of the auxiliary magnetic pole and the magnetic cavity of FIG. 4.

FIG. 12 is an enlarged view of the auxiliary magnetic pole 418 and the magnetic cavities 416 and 417 of the cross-sectional view illustrated in FIG. 4. The configurations are similar to those of the first embodiment except the following contents described below.

The rotor core 405 illustrated in FIG. 12 is configured by a first side 420 which corresponds to one side of the magnetic cavity 417 formed about the q axis in the auxiliary magnetic pole 418 serving as an interpole section of the magnetic pole, and a second side 421 which corresponds to one side of the magnetic cavity 416 formed on both sides of the permanent magnet 415, and is disposed symmetrically to the d axis. Further, assuming that a radius of the surface where the magnetic cavity 417 of the rotor core 405 is not formed is defined as R, a distance from the center of the rotor to the bottom of the magnetic cavity 417 is defined as r, and a dimension where the first side 420 and the second side 421 are parallel is defined as D, the dimension of D is desirably set to satisfy a relation of $D \geq R-r$.

Even in this case, the permanent magnet 415 is fixed into the magnetic insertion hole 410 using an epoxy adhesive. In addition, the magnetic cavities 416 formed on both sides of the permanent magnet 415 may also be buried with an adhesive, or may be integrally fixed with the permanent magnet 415 using a shaping resin.

With the configuration of the magnetic cavity 417 of this embodiment, it is possible to avoid the magnetic cavities 416 and 417 of the adjacent core pieces 406 from being over-lapped with each other when the permanent magnet 415 and the core piece 406 are skewed in the width direction of the rotor. Therefore, it is possible to prevent the adhesive filled in the magnetic insertion hole 410 from leaking out of the rotor core 405.

Third Embodiment

Figure 13:
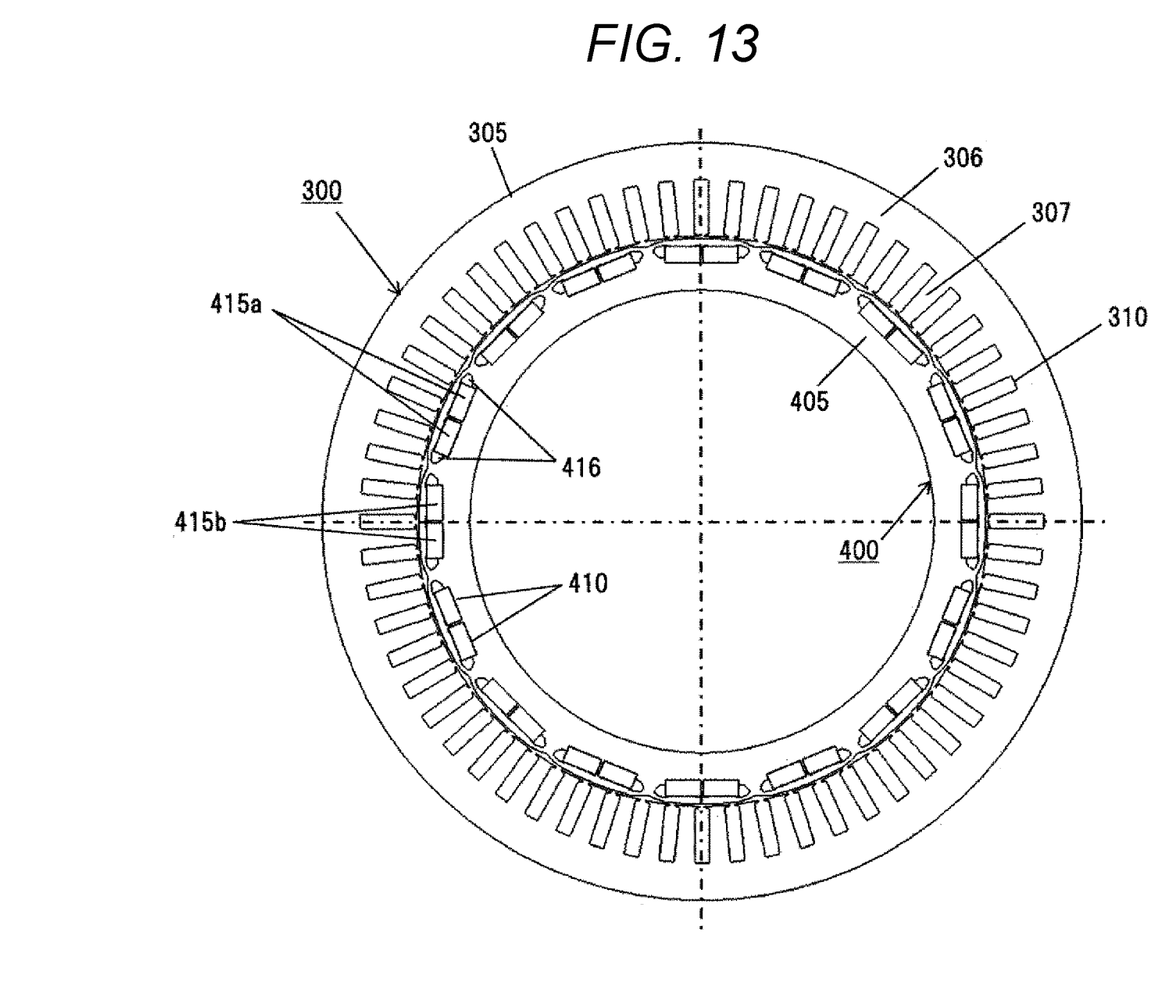
FIG. 13 is a cross-sectional view illustrating a stator and a rotor of a distributed-winding rotary electric machine according to another embodiment of the present invention.

FIG. 13 is a diagram illustrating a case where the stator winding 315 illustrated in FIG. 3 is formed in a distribution winding manner. The torque ripples in this embodiment vary depending on the shape of the rotor 400. Therefore, even in a case where the stator 300 is wound in a different manner such as a distribution winding manner, the reduction of the torque ripples can be achieved similarly to the above-described case. The other configurations are similar to those described in the first and second embodiments.

Fourth Embodiment

Further, in the examples illustrated in FIGS. 3 and 13, the permanent magnet 415 buried in the magnetic insertion hole 410 of the rotor core 405 is disposed such that the surface of the magnet is perpendicular to the d axis. However, the magnetic insertion hole 410 and the permanent magnet 415 may be disposed, for example, a V shape about the d axis instead of being perpendicular to the d axis.

The embodiments described above achieve the following operational effects.

The magnetic cavity 417 in the auxiliary magnetic pole 418 is formed about the q axis. The plurality of core pieces 406 are stacked and connected while deviating at a predetermined angle with respect to the peripheral direction of the axis of the rotor so as to provide a skew. As a result, it is possible to reduce the torque ripples of the rotary electric machine when powered up. In particular, in a case where the rotary electric machine of this embodiment which can reduce the torque ripples when powered up is applied as a drive motor of a vehicle such as an electric vehicle, vibrations and noises during accelerating at a low speed. Further, it is possible to provide an electric vehicle which is comfortable to ride in and excellent in silence.

Further, the embodiments have been described about a motor for driving a vehicle. However, the present invention is not limited thereto, and can be applied to various types of motors. Further, the present invention is not limited to the motors, and can be applied to various types of rotary electric machines such as a power generator (for example, alternator). In addition, the present invention is not limited to the above-described embodiments without adversely affecting the features of the present invention.

REFERENCE SIGNS LIST 100 vehicle
110 wheel
120 engine
130 transmission
140 differential gear
150 battery
160 power conversion device
200, 201 rotary electric machine
205 housing
210 end bracket
300 stator
305 stator core
306 yoke core 307 teeth core
310 slot
315 stator winding
400 rotor
405 rotor core
406 core piece
410 magnetic insertion hole
415 permanent magnet
416, 417 magnetic cavity
418 auxiliary magnetic pole
419 center portion in peripheral direction of magnetic varying region
420 first side
421 second side
440 end plate
445, 446 gear
450 shaft
500 gap

The invention claimed is:

1. A magnet-type rotor, comprising:
a plurality of permanent magnets; and
a plurality of core pieces which form a magnetic insertion hole,
wherein the plurality of core pieces are stacked to skew the permanent magnet,
wherein the plurality of core pieces form a magnetic resistance varying portion to cancel a harmonic number different from a harmonic number which is cancelled by the skew, and
wherein the magnetic resistance varying portion is formed such that a center portion in a peripheral direction of a magnetic varying region generated by the magnetic resistance varying portion is overlapped with a q axis,
wherein the magnetic resistance varying portion is a magnetic cavity,
wherein the magnetic cavity is a concave portion which is formed in a surface of each of the plurality of core pieces,
wherein one side of the concave portion and one side near an auxiliary salient pole of the magnetic insertion hole are almost parallel,
wherein a distance between the one side of the concave portion and the one side near the auxiliary salient pole is defined as D,
wherein a radius of a surface where the concave portion of each of the plurality of core pieces is not formed is defined as R,
wherein a distance from a center of rotation to a bottom of the concave portion is defined as r, and
wherein each of the plurality of core pieces is formed to satisfy $D \geq R-r$.

2. The magnet-type rotor according to claim 1,
wherein additional magnetic cavities are formed at ends of each of the plurality of permanent magnets that are adjacent to the q axis, the additional magnetic cavities being arranged between the permanent magnets and the first magnetic cavity.

3. The magnet-type rotor according to claim 1,
wherein the concave portion is symmetrically formed in the peripheral direction on a q axis.

4. The magnet-type rotor according to claim 1,
wherein the harmonic number cancelled by the skew is a high-order harmonic compared to the harmonic number cancelled by the magnetic resistance varying portion.

5. The magnet-type rotor according to claim 1,
wherein the plurality of core pieces are formed by stacking a plurality of steel plates in a direction of a rotation axis.

6. A rotary electric machine, comprising:
the magnet-type rotor according to claim 1, and
a stator which includes a stator winding, the stator winding being wound in a concentrated winding method.

7. A rotary electric machine, comprising:
the magnet-type rotor according to claim 1, and
a stator which includes a stator winding, the stator winding being wound in a distributed winding method.

8. An electric vehicle which uses a torque of the rotary electric machine equipped with the magnet-type rotor according to claim 1 as a drive force.

* * * * *